United States Patent
Kedarisetti et al.

(10) Patent No.: US 11,303,877 B2
(45) Date of Patent: Apr. 12, 2022

(54) METHOD AND SYSTEM FOR ENHANCING USE OF TWO-DIMENSIONAL VIDEO ANALYTICS BY USING DEPTH DATA

(71) Applicant: Avigilon Corporation, Vancouver (CA)

(72) Inventors: Dharanish Kedarisetti, Somerville, MA (US); Pietro Russo, Melrose, MA (US); Peter L. Venetianer, McLean, VA (US); Mahesh Saptharishi, Sudbury, MA (US)

(73) Assignee: AVIGILON CORPORATION, Vancouver (CA)

( * ) Notice: Subject to any disclaimer, the term of this patent is extended or adjusted under 35 U.S.C. 154(b) by 112 days.

(21) Appl. No.: 16/539,888

(22) Filed: Aug. 13, 2019

(65) Prior Publication Data

US 2021/0051312 A1 Feb. 18, 2021

(51) Int. Cl.
*H04N 13/268* (2018.01)
*G06T 15/40* (2011.01)
*G06T 7/50* (2017.01)
*H04N 13/239* (2018.01)
(Continued)

(52) U.S. Cl.
CPC ............ *H04N 13/268* (2018.05); *G06T 7/50* (2017.01); *G06T 15/405* (2013.01); *H04N 13/239* (2018.05); *G06T 2207/10028* (2013.01); *G06T 2207/30201* (2013.01); *H04N 2013/0081* (2013.01)

(58) Field of Classification Search
USPC .................................................. 382/224, 154
See application file for complete search history.

(56) References Cited

U.S. PATENT DOCUMENTS

| 8,199,208 B2* | 6/2012 | Katsumata ............. H04N 5/144 348/211.99 |
| 8,619,082 B1 | 12/2013 | Ciurea et al. |
| 9,225,889 B1 | 12/2015 | Korkin |

(Continued)

FOREIGN PATENT DOCUMENTS

| WO | 2018141109 A1 | 8/2018 |
| WO | 2018173819 A1 | 9/2018 |

OTHER PUBLICATIONS

International Search Report dated Nov. 4, 2020 issued on corresponding International Application No. PCT/CA2020/051091, 5 pages.

*Primary Examiner* — Kathleen Y Dulaney
(74) *Attorney, Agent, or Firm* — Perry + Currier, Inc.

(57) ABSTRACT

Methods, systems, and techniques for enhancing use of two-dimensional (2D) video analytics by using depth data. Two-dimensional image data representing an image comprising a first object is obtained, as well as depth data of a portion of the image that includes the first object. The depth data indicates a depth of the first object. An initial 2D classification of the portion of the image is generated using the 2D image data without using the depth data. The initial 2D classification is stored as an approved 2D classification when the initial 2D classification is determined consistent with the depth data. Additionally or alternatively, a confidence level of the initial 2D classification may be adjusted depending on whether the initial 2D classification is determined to be consistent with the depth data, or the depth data may be used with the 2D image data for classification.

23 Claims, 7 Drawing Sheets

(51) Int. Cl.
*H04N 13/00* (2018.01)
*G06K 9/00* (2006.01)

(56) References Cited

U.S. PATENT DOCUMENTS

| | | |
|---|---|---|
| 9,247,211 B2* | 1/2016 | Zhang .................... H04N 7/181 |
| 9,641,755 B2 | 5/2017 | Lynch |
| 10,027,883 B1* | 7/2018 | Kuo .................... H04N 5/23293 |
| 2006/0204050 A1* | 9/2006 | Takizawa ........... G06K 9/00912 382/115 |
| 2009/0213219 A1* | 8/2009 | Eggert .................... G06T 7/277 348/148 |
| 2010/0246890 A1* | 9/2010 | Ofek .................... G06K 9/3258 382/105 |
| 2012/0051594 A1 | 3/2012 | Kim et al. |
| 2012/0087573 A1* | 4/2012 | Sharma ............. G06K 9/00771 382/154 |
| 2013/0182904 A1* | 7/2013 | Zhang .................. A61B 5/1073 382/103 |
| 2013/0202161 A1* | 8/2013 | Shor .................. G06K 9/00241 382/118 |
| 2013/0342652 A1* | 12/2013 | Kikkeri .................... B25J 9/104 348/46 |
| 2014/0049612 A1* | 2/2014 | Ishii ........................ G06T 7/593 348/46 |
| 2014/0093159 A1* | 4/2014 | Nguyen .................. G06T 19/20 382/154 |
| 2015/0016693 A1* | 1/2015 | Gattuso ............. H04N 5/23219 382/118 |
| 2015/0302252 A1* | 10/2015 | Herrera ............. G06K 9/00281 382/117 |
| 2016/0105636 A1* | 4/2016 | Guo ........................ H04N 19/17 348/14.15 |
| 2016/0171315 A1* | 6/2016 | Yi ........................ H04N 13/204 382/154 |
| 2018/0373348 A1* | 12/2018 | Price .................... G01B 11/026 |

* cited by examiner

METHOD AND SYSTEM FOR ENHANCING USE OF TWO-DIMENSIONAL VIDEO ANALYTICS BY USING DEPTH DATA

TECHNICAL FIELD

The present disclosure is directed at methods, systems, and techniques for enhancing the use of two-dimensional video analytics by using depth data.

BACKGROUND

Video analytics refers generally to the ability to automatically analyze video to determine properties or characteristics of that video. For example, video analytics may be used to automatically segment the foreground and/or background of a video; detect, track, or classify objects depicted in the video; or recognize faces of individuals in the video. Conventional two-dimensional video is limited in that it lacks explicit information regarding the depths of objects and environment depicted in the video.

SUMMARY

According to a first aspect, there is provided a method comprising: obtaining two-dimensional (2D) image data representing an image comprising a first object; obtaining depth data of a portion of the image that comprises the first object, wherein the depth data indicates a depth of the first object; generating an initial 2D classification of the portion of the image using the 2D image data without using the depth data; determining whether the initial 2D classification of the portion of the image is consistent with the depth data; and when the initial 2D classification of the portion of the image is consistent with the depth data, storing the initial 2D classification as an approved 2D classification.

The method may further comprise when the initial 2D classification is inconsistent with the depth data, rejecting the initial 2D classification.

Determining whether the initial 2D classification is consistent with the depth data may comprise: determining a 2D size of the first object using the 2D image data without using the depth data; comparing the 2D size of the first object to an expected size of the first object for the depth of the first object; and determining that the initial 2D classification is consistent with the depth of the first object when the 2D size of the first object is the expected size of the first object.

Determining whether the initial 2D classification is consistent with the depth data may comprise: determining by using the depth data whether the depth across the first object varies; and when the depth data indicates that the depth across the first object varies, storing the initial 2D classification as the approved 2D classification.

The depth data may indicate that the depth across the first object is constant, and the first object may be a shadow or a reflection.

The portion of the image represented by the depth data may further comprise an obstruction abutting the first object, the depth data may indicate the obstruction is nearer to a sensor that originated the depth data than the first object, and determining whether the initial 2D classification is consistent with the depth data may comprise: determining by using the depth data an unobstructed portion of the first object; determining a subsequent classification using the unobstructed portion of the first object and without using the obstruction; and when the subsequent classification and the initial 2D classification match, storing the initial 2D classification as the approved 2D classification.

The first object may comprise a first face, the initial 2D classification may be that the first face is of a person who interacted with a credentials reader, the portion of the image represented by the depth data may further comprise a second face, and determining whether the initial 2D classification is consistent with the depth data may comprise: determining, using the depth data, whether the first face or the second face is nearer to the credentials reader; and when the depth data indicates that the first face is nearer to the credentials reader than the second face, storing the initial 2D classification as the approved 2D classification.

The method may further comprise: when the depth data indicates that the second face is nearer to the credentials reader than the first face, storing as the approved 2D classification that the second face is of the person who interacted with the credentials reader.

The first object may comprise a first face, the portion of the image represented by the depth data further may comprise a second object comprising a second face, and determining whether the initial 2D classification is consistent with the depth data may comprise: determining, using the depth data and without using the 2D image data, that the second face is present in the portion of the image; and when the initial 2D classification classifies each of the first and the second objects as a face, storing the initial 2D classification as the approved 2D classification.

The initial 2D classification may be performed by a processor applying a first video analytics based method that causes the processor to determine the initial 2D classification as classifying the first object as a face and not the second object as a face, and the method may further comprise, when the initial 2D classification classifies the first object and not the second object as a face, guiding the first video analytics based method or applying a second video analytics based method to generate another 2D classification of the portion of the image that classifies each of the first and the second objects as a face.

The method may further comprise classifying, using the depth data without using the 2D image data, the portion of the image to identify fixed scene features, and determining whether the initial 2D classification is consistent with the depth data may comprise determining whether the initial 2D classification is consistent with the fixed scene features.

The first object may comprise at least part of a person, and determining whether the initial 2D classification is consistent with the fixed scene features may comprise: determining, from the fixed scene features, whether the portion of the image permits the person to be present; and when the portion of the image permits the person to be present, storing the initial 2D classification as the approved 2D classification.

According to another aspect, there is provided a method comprising: obtaining two-dimensional (2D) image data representing an image comprising a first object; obtaining depth data of a portion of the image that comprises the first object, wherein the depth data indicates a depth of the first object; generating an initial 2D classification of the portion of the image using the 2D image data without using the depth data; determining whether the initial 2D classification of the portion of the image is consistent with the depth data; and when the initial 2D classification of the portion of the image is consistent with the depth data, increasing a confidence level of the initial 2D classification.

Increasing the confidence level of the initial 2D classification may comprise storing metadata representing an increase in the confidence level of the initial 2D classification.

The method may further comprise when the initial 2D classification is inconsistent with the depth data, decreasing a confidence level of the initial 2D classification.

Decreasing the confidence level of the initial 2D classification may comprise storing metadata representing a decrease in the confidence level of the initial 2D classification.

According to another aspect, there is provided a method comprising: obtaining two-dimensional (2D) image data representing an image comprising a first object; obtaining depth data of a portion of the image that comprises the first object, wherein the depth data indicates a depth of the first object; classifying, using the depth data, the portion of the image to identify fixed scene features; and generating a 2D classification using the fixed scene features and the 2D image data.

According to another aspect, there is provided a method comprising: obtaining, using a first image sensor, a first two-dimensional (2D) image; obtaining, using a second image sensor co-located with the first image sensor and having an overlapping field of view with the first image sensor, a second 2D image captured concurrently with the first 2D image; and generating: a three-dimensional image by performing a stereoscopic combination of the first and second 2D images; and from the first and second 2D images, a third 2D image that has a higher resolution than a resolution of either the first and second 2D images.

The first image sensor may be a red green blue (RGB) image sensor and the second image sensor may be a monochrome image sensor.

Each of the first and second image sensors may be a monochrome sensor.

Generating the third 2D image may comprise interpolating pixels of the third 2D image from the first and second images.

According to another aspect, there is provided a memory device having stored thereon computer program code that is executable by a processor and that, when executed by the processor, causes the processor to perform the method of any of the foregoing aspects or suitable combinations thereof.

According to another aspect, there is provided a system, comprising: a camera configured to output two-dimensional (2D) image data representing an image comprising a first object and depth data of a portion of the image that comprises the first object, wherein the depth data indicates a depth of the first object; and a computing device, comprising: a processor communicatively coupled to the camera; and a memory device according to one of the foregoing aspects.

According to another aspect, there is provided a camera, comprising: a housing; a first lens and a second lens respectively focusing light on a first image sensor and a second image sensor located within the housing, wherein the first and second image sensors have overlapping fields of view; a processor located within the housing and communicatively coupled to the first and second image sensors; and a memory device according to one of the foregoing aspects.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The detailed description refers to the following figures, in which.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The terms "coupled", "coupling" or "connected" as used herein can have several different meanings depending in the context in which these terms are used. For example, the terms coupled, coupling, or connected can have a mechanical, software, or electrical connotation. For example, as used herein, the terms coupled, coupling, or connected can indicate that two elements or devices are directly connected to one another or connected to one another through one or more intermediate elements or devices via an electrical element, electrical signal, software connection, or a mechanical element depending on the particular context.

Herein, an image may include a plurality of sequential image frames, which together form a video captured by the video capture device. Each image frame may be represented by a matrix of pixels, each pixel having a pixel image value. For example, the pixel image value may be a numerical value on grayscale (ex; 0 to 255) or a plurality of numerical values for colored images. Examples of color spaces used to represent pixel image values in image data include RGB, YUV, CYKM, YCBCR 4:2:2, YCBCR 4:2:0 images.

Processing video may include, but is not limited to, image processing operations, analyzing, managing, compressing, encoding, storing, transmitting and/or playing back the video data. Analyzing the video may include segmenting areas of image frames and detecting visual objects, tracking and/or classifying visual objects located within the captured scene represented by the image data. The processing of the image data may also cause additional information regarding the image data or visual objects captured within the images to be output. For example, such additional information is commonly understood as metadata. The metadata may also be used for further processing of the image data, such as drawing bounding boxes around detected objects in the image frames. "Metadata" or variants thereof herein refers to such information obtained by computer-implemented analysis of images, including images, in video.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
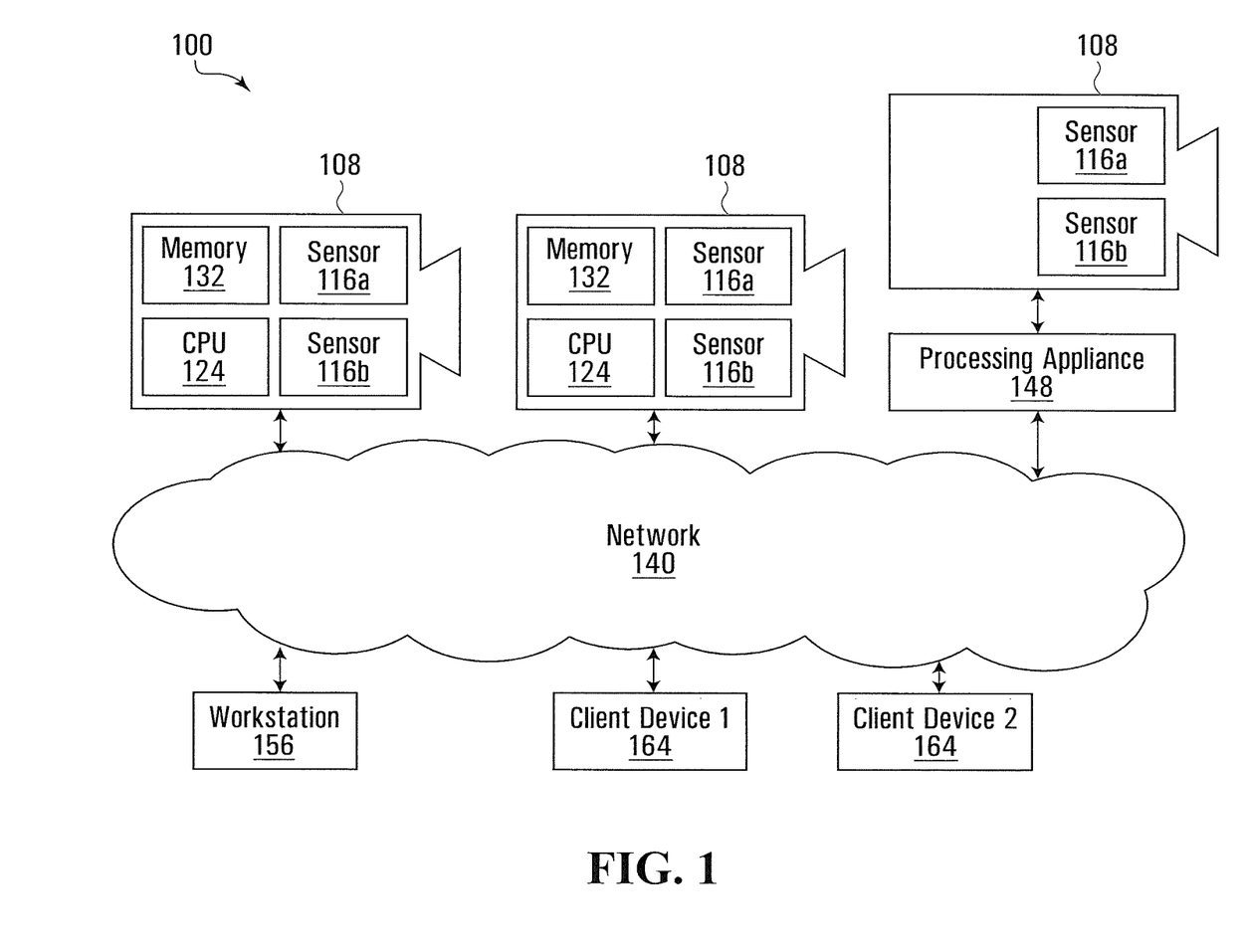
FIG. 1 illustrates a block diagram of connected devices of a video capture and playback system according to an example embodiment.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 (hereinafter interchangeably referred to as a "camera 108") being operable to capture a plurality of images and produce image data representing the plurality of captured images. The camera 108 is an image capturing device and includes security video cameras.

Each camera 108 in the example embodiment depicted in FIG. 1 includes a first image sensor 116a and a second image sensor 116b for capturing a plurality of images; concurrently captured images may be stereoscopically combined to generate depth data, as described further below in respect of FIGS. 3A and 3B. The camera 108 may be a digital video camera and the image sensors 116a,b may output captured light as a digital data. For example, the image sensors 116a,b may be a CMOS, NMOS, or CCD. In some embodiments, the camera 108 may be an analog camera connected to an encoder.

The image sensors 116a,b may be operable to capture light in one or more frequency ranges. For example, the image sensors 116a,b may be operable to capture light in a range that substantially corresponds to the visible light frequency range. In other examples, the image sensors 116a,b may be operable to capture light outside the visible light range, such as in the infrared and/or ultraviolet range. In other examples, the camera 108 may be a multi-sensor camera that includes two or more sensors that are operable to capture light in different frequency ranges.

The at least one camera 108 may include a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera 108. For example, the dedicated camera may be a surveillance camera, such as any one of a pan-tilt-zoom camera, dome camera, in-ceiling camera, box camera, and bullet camera.

Additionally, or alternatively, the at least one camera 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each camera 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, a general purpose processor and one or more of a GPU or VPU, and a DSP may be implemented together within the SOC.

Continuing with FIG. 1, each of the at least one camera 108 is connected to a network 140. Each camera 108 is operable to output image data representing images that it captures and transmit the image data over the network.

It will be understood that the network 140 may be any suitable communications network that provides reception and transmission of data. For example, the network 140 may be a local area network, external network (such as, for example, a WAN, or the Internet) or a combination thereof. In other examples, the network 140 may include a cloud network.

In some examples, the video capture and playback system 100 includes a processing appliance 148. The processing appliance 148 is operable to process the image data output by a camera 108. The processing appliance 148 also includes one or more processors and one or more memory devices coupled to a processor (CPU). The processing appliance 148 may also include one or more network interfaces. For convenience of illustration, only one processing appliance 148 is shown; however it will be understood that the video capture and playback system 100 may include any suitable number of processing appliances 148.

For example, and as illustrated, the processing appliance 148 is connected to a camera 108 which may not have memory 132 or CPU 124 to process image data. The processing appliance 148 may be further connected to the network 140.

According to one example embodiment, and as illustrated in FIG. 1, the video capture and playback system 100 includes at least one workstation 156 (such as, for example, a server), each having one or more processors including GPUs and/or VPUs. The at least one workstation 156 may also include storage memory. The workstation 156 receives image data from at least one camera 108 and performs processing of the image data. The workstation 156 may further send commands for managing and/or controlling one or more of the image capture devices 108. The workstation 156 may receive raw image data from the camera 108. Alternatively, or additionally, the workstation 156 may receive image data that has already undergone some intermediate processing, such as processing at the camera 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, a mouse, keyboard, or touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 186 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2A:
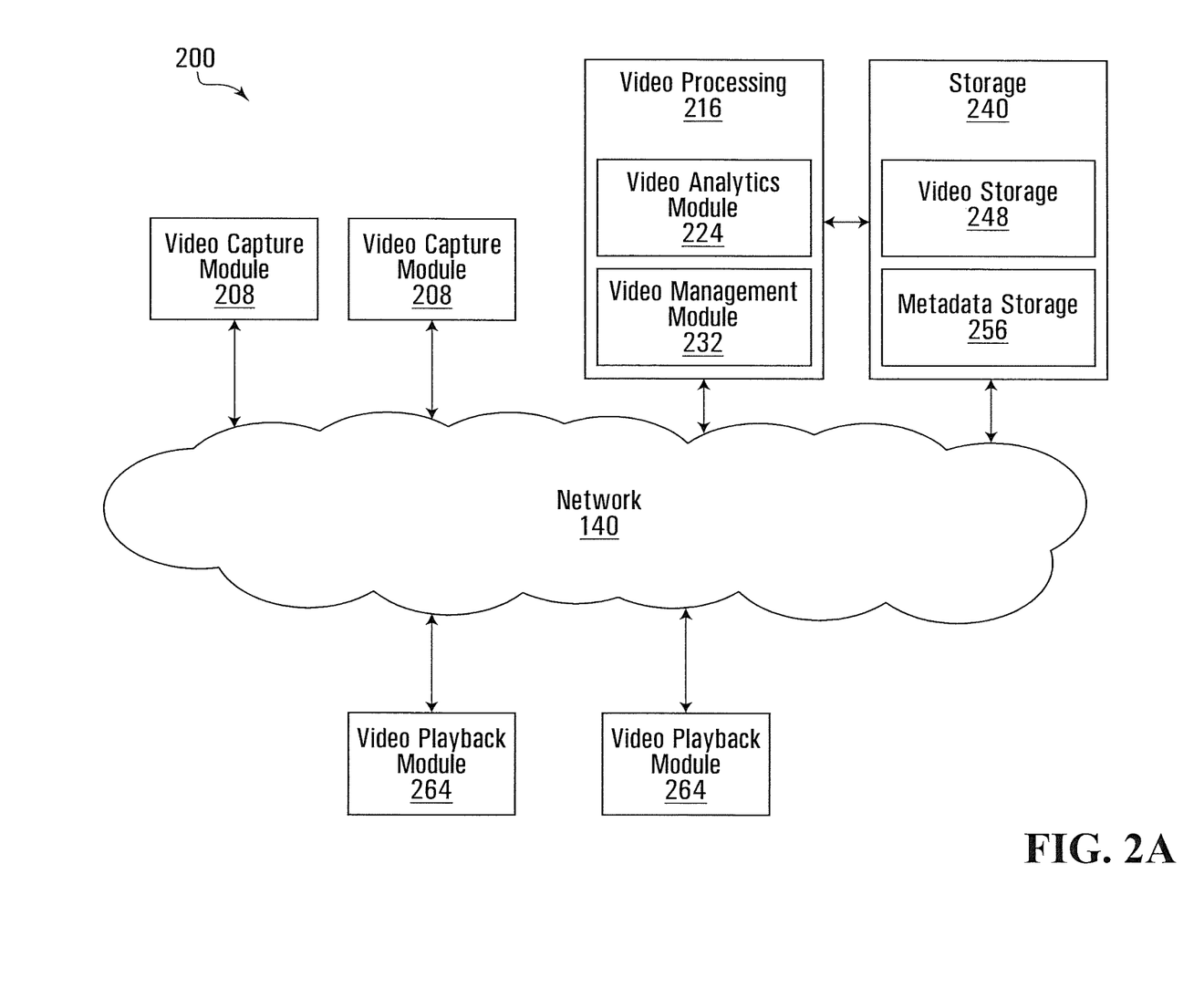
FIG. 2A illustrates a block diagram of a set of operational modules of the video capture and playback system according to one example embodiment.

Referring now to FIG. 2A, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules include at least one video capture module 208. For example, each camera 108 may implement a video capture module 208. The video capture module 208 is operable to control one or more components (such as, for example, sensor 116) of a camera 108 to capture images.

The set 200 of operational modules includes a subset 216 of video (image) processing modules. For example, and as illustrated, the subset 216 of video processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind" or "removed", unusual motion or event detection, and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data output from the video analytics module 224.

It will be understood that while video storage module 248 and metadata storage module 256 are illustrated as separate modules, they may be implemented within a same hardware storage whereby logical rules are implemented to separate stored video from stored metadata. In other example embodiments, the video storage module 248 and/or the metadata storage module 256 may be implemented using hardware storage using a distributed storage scheme.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 2B:
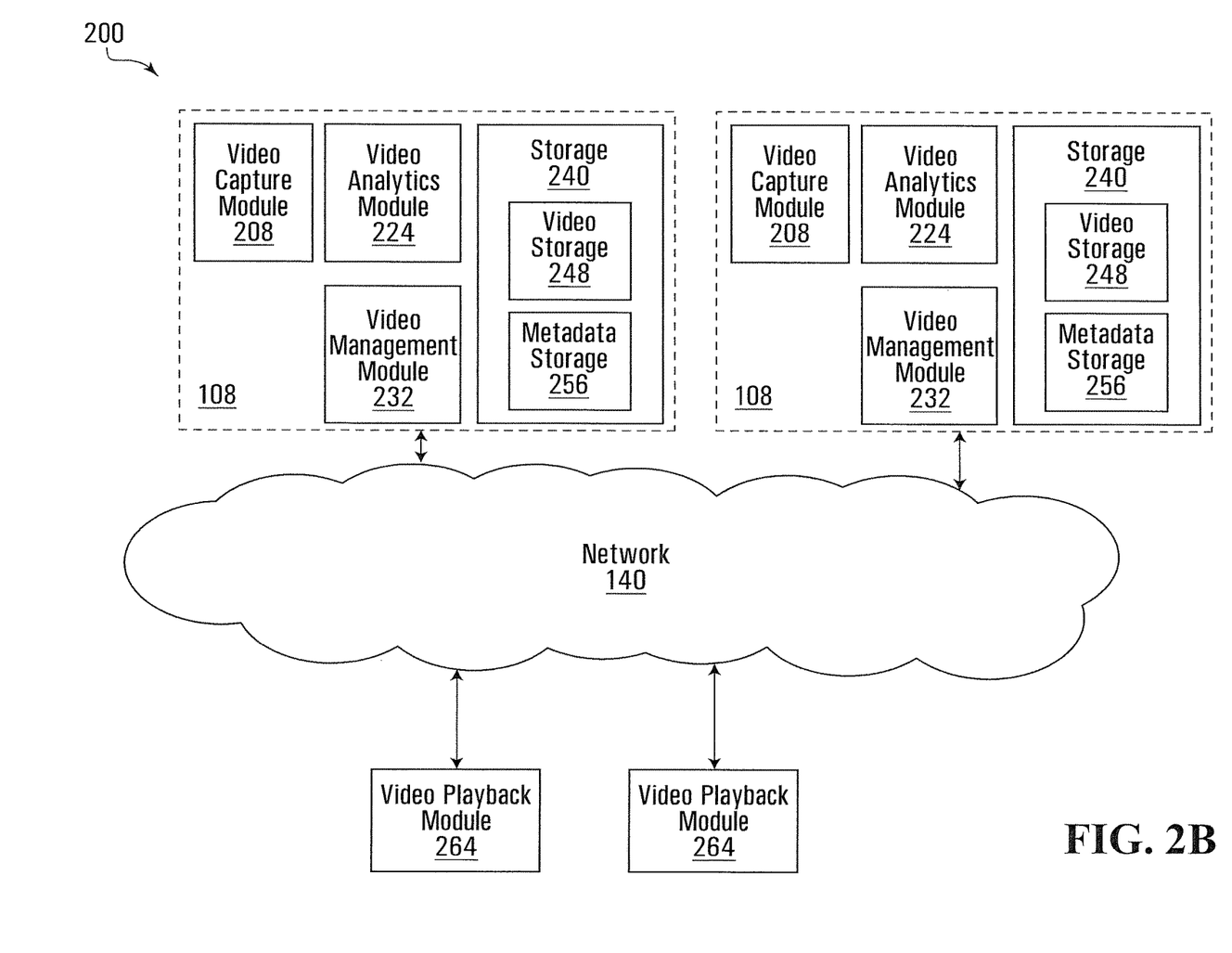
FIG. 2B illustrates a block diagram of a set of operational modules of the video capture and playback system according to one particular example embodiment in which the video analytics module 224, the video management module 232, and the storage 240 are wholly implemented on the one or more cameras 108.

Referring now to FIG. 2B, therein illustrated is a block diagram of a set 200 of operational modules of the video capture and playback system 100 according to one particular example embodiment wherein the video analytics module 224, the video management module 232 and the storage 240 is wholly implemented on the one or more image capture devices 108. Alternatively, the video analytics module 224, the video management module 232 and the storage 240 is wholly or partially implemented on one or more processing appliances 148.

It will be appreciated that allowing the subset 216 of video (image) data processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (such as, for example, manufacturers) or retrofitting an existing video capture and playback system.

Video analytics that rely exclusively on two-dimensional (2D) image data ("2D video analytics") may in certain circumstances inaccurately detect or classify objects as a result of the 2D image data lacking depth data. For example, the video analytics may erroneously classify a person's reflection or shadow as the actual person, on the basis that the outline or appearance of that reflection or shadow is substantially similar to the actual person's outline or appearance. Similarly, the 2D video analytics may erroneously classify a miniature version of an object, such as a photograph of a car, as the actual object, if that miniature version is positioned sufficiently near to a camera and as a result approximates in size an actual version of the object positioned farther away from the camera. While in certain circumstances increased processing can be done to mitigate the effect of errors like these ones, mitigation is not always possible and, even when possible, requires increased computational resources.

In at least some of the example embodiments described herein, depth data is used to enhance the use of 2D video analytics. The video analytics module 224 may, for example, obtain 2D image data representing an image including an object, and also obtain depth data of at least a portion of the image that includes the object. The object may be an object to be classified, such as a vehicle or a person. The depth data indicates a depth of the object; for example, the depth data may include a single depth value for the object (e.g., an average depth of the object, or a depth of an arbitrary point on the object), or alternatively may include multiple depth values for the object (e.g., depth values corresponding to different points on the first object). The video analytics module 224 may generate an initial 2D classification of the portion of the image using the 2D image data without using the depth data. After determining the depth values, the video analytics module 224 can determine whether the initial 2D classification of the portion of the image is consistent with the depth data. If the initial 2D classification is consistent with the depth data, then the initial 2D classification is flagged as an approved 2D classification and may be stored, in volatile and/or non-volatile memory. For example, the initial 2D classification may be stored on the memory device 132, or transmitted over a network to be stored on one or both of the workstation 156 and client devices 164. If the initial 2D classification is inconsistent with the depth data, then the initial 2D classification may be rejected and appropriate remedial action may be taken. For example, a different type of video analytics based method may be used in an attempt to generate a classification that is consistent with the depth data.

In an embodiment, the initial 2D classification is associated with a confidence level, and the depth data can be used to adjust the confidence level. For example, if the depth data is consistent with the 2D classification, then the confidence is level of the classification is increased, for example, by an amount associated with the level of consistency. If the depth data is inconsistent with the 2D classification, the confidence level of the classification can be reduced.

The depth data may be generated using any suitable sensor. The sensor may, for example, be a standalone sensor (not depicted) that is calibrated for use with one or more of the cameras 108, or be integrated within the camera 108 itself. Example suitable standalone sensors comprise radar sensors or time-of-flight sensors such as LIDAR sensors. In at least some example embodiments in which standalone depth sensors are used to generate depth data, the system 100 as depicted in FIG. 1 may rely on cameras 108 comprising only a single image sensor 108 that accordingly output only 2D image data. Example suitable cameras 108 that comprise a depth sensor are stereoscopic cameras (whether active or passive) such as image capture device 108 depicted in FIG. 1, and structured light cameras. FIGS. 3A and 3B depict perspective and schematic block diagram views, respectively, of an example stereoscopic camera 108 that may be used to generate 2D and depth data in at least some example embodiments.

Figure 3A:
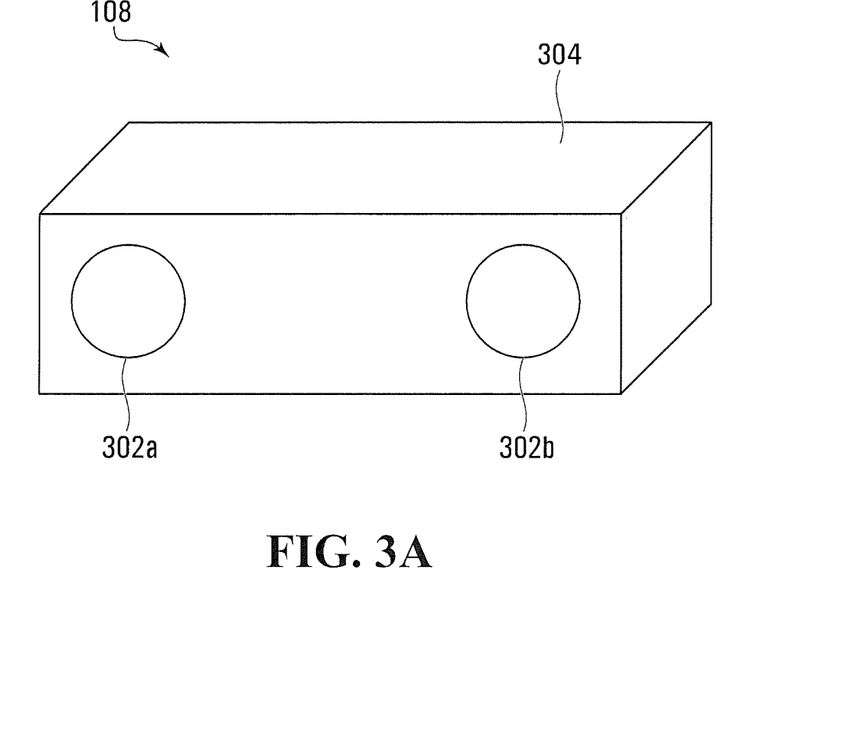
FIGS. 3A and 3B respectively depict example perspective and schematic block diagram views of a camera for outputting two-dimensional video and depth data, according to an example embodiment.
Figure 3B:
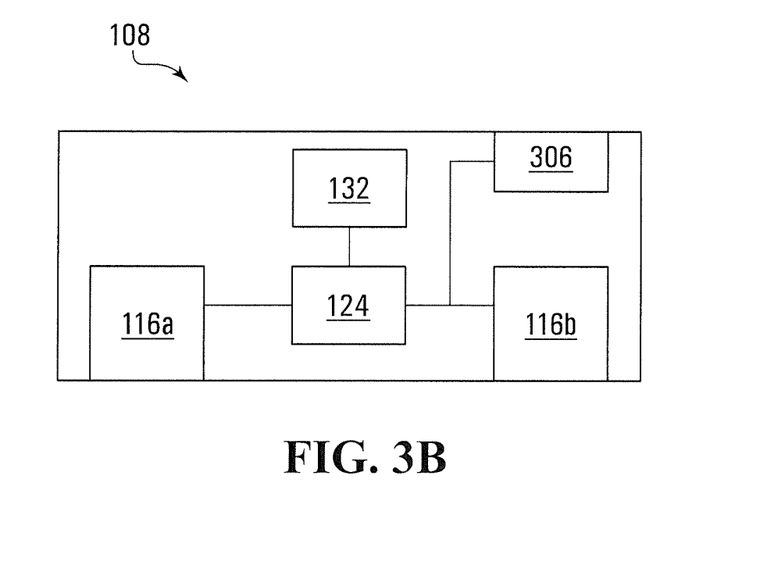

The camera 108 of FIGS. 3A and 3B is a passive stereo camera. The camera 108 comprises a rectangular housing 304 having a front side with a pair of apertures through which first and second lenses 302a,b receive light. The lenses 302a,b are symmetrically located about a vertically extending midline of the camera 108 and have a substantially overlapping field-of-view. The first and second lenses 302a,b respectively focus light on first and second image sensors 116a,b contained within the housing 304. The housing 304 also contains a network interface card 306 to facilitate communication with the network 140, a memory device 132, and a processor 124, which is communicatively coupled to the memory device 132, the network interface card 306, and each of the image sensors 116a,b. The image sensors 116a,b may be of any suitable type or combination. For example, one of the image sensors 116a,b may be an RGB image sensor and the other of the image sensors 116a,b may be a monochrome image sensor; alternatively, both of the image sensors 116a,b may be monochrome image sensors. Furthermore, the image sensors 116a,b may be of any suitable resolution, and they may be of identical resolution or have different resolutions.

Figure 4:
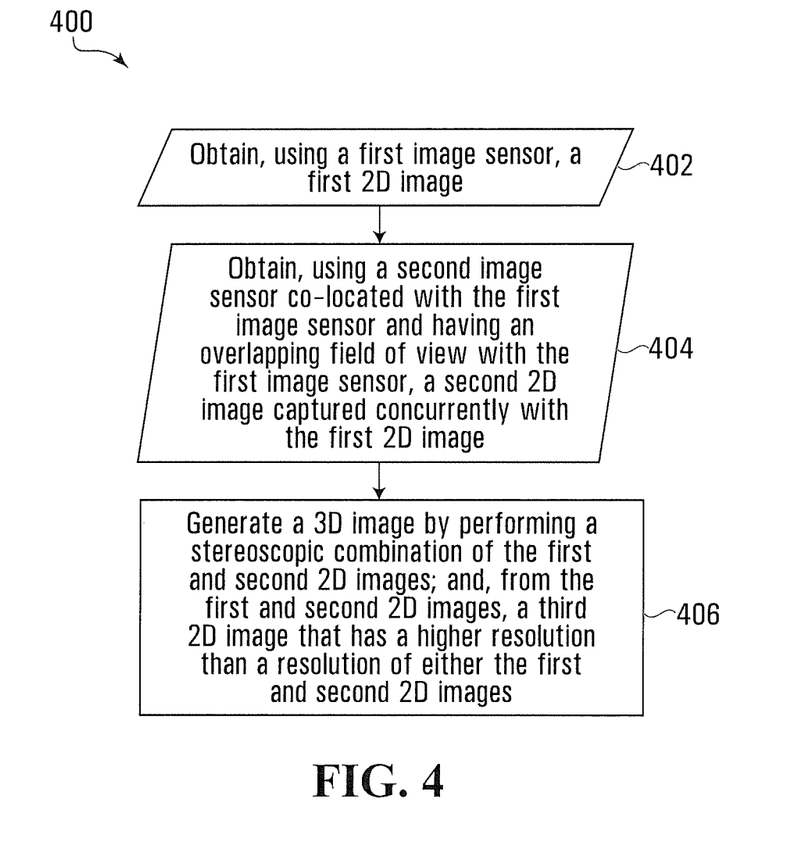
FIG. 4 depicts a method for generating, from first and second two-dimensional images, a three-dimensional image and a third two-dimensional image of higher resolution than the first and second two-dimensional images, according to another example embodiment.

FIG. 4 depicts a method 400 for generating, from first and second 2D images, a three-dimensional (3D) image and a third 2D image of higher resolution than the first and second 2D images, according to at least some example embodiments. The method 400 may be expressed as computer program code that is executable by the processor 124 and that is stored on the memory device 132. When executed by the processor 124, the computer program code causes the processor 124 to perform the method 400.

The processor 124 begins performing the method at block 402, where it obtains, using the first image sensor 116a, a first 2D image. At block 404, the processor 124 also obtains, using the second image sensor 116b, a second 2D image that is captured concurrently with the first 2D image. While in at least the presently described example embodiment the first 2D image is obtained only using data from the first image sensor 116a and the second 2D image is obtained only using data from the second image sensor 116b, in at least some different example embodiments different implementations are possible. For example, in at least some different example embodiments, the first 2D image may be generated using data only from the second image sensor 116b and the second 2D image may be generated using data only from the first image sensor 116a. Alternatively, one or both of the first and second 2D images may be generated using image data from both of the image sensors 116a,b. For example, one or both of the 2D images may be generated by stitching together part of an image obtained using data only from the first image sensor 116a, and part of another image obtained using data only from the second image sensor 116b.

At block 406, the processor 124 generates a 3D image by performing a stereoscopic combination of the first and second 2D images. The 3D image comprises depth data for those portions of the first and second 2D images in the field-of-view shared by the two image sensors 116a,b. In at least the presently described example embodiment, the fields-of-view of the first and second image sensors 116a,b substantially entirely overlap; however, in at least some different example embodiments, less than substantially all of the field-of-view of one of the image sensors 116a,b may overlap with all or less than substantially all of the field-of-view of the other of the image sensors 116a,b.

At block 406 the processor 124 also generates a third 2D image that has a higher resolution than a resolution of either the first and second 2D images. In at least the presently described example embodiment, the processor 124 calculates (e.g., using interpolation) pixels of the third 2D image from the first and second 2D images. For example, in an example embodiment in which each of the image sensors 116a,b has a 2 MP resolution, the processor 124 may interpolate a third 2D image having a resolution of 10 MP. While the processor 124 uses methods such as interpolation to generate the third 2D image in the presently described example embodiment, in at least some different example embodiments the processor 124 may apply different methods, such as by generating pixels using a neural network.

Figure 5:
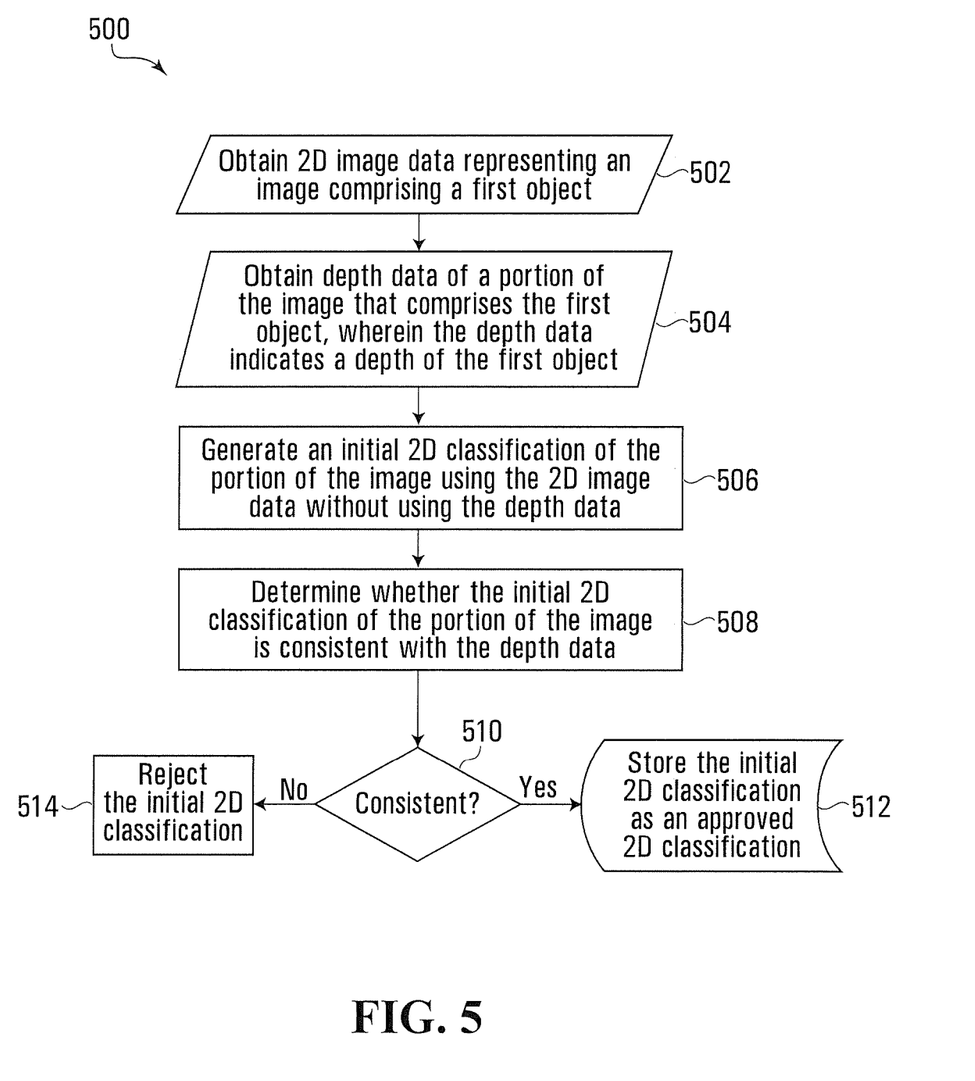
FIG. 5 depicts a method for enhancing the use of two-dimensional video analytics by using depth data, according to another example embodiment.

The processor 124 may use the third 2D image and the depth data represented by the 3D image in applying a method 500 for enhancing the use of 2D video analytics by using depth data, as depicted in FIG. 5. The method 500 of FIG. 5 may be expressed as computer program code that is executable by the processor 124 and that is stored on the memory device 132. When executed by the processor 124, the computer program code causes the processor 124, and more particularly in at least some example embodiments the video analytics module 224, to perform the method 500. While in at least the presently described example embodiment the third 2D image, which has a higher resolution image than either of the first and second 2D images is used when performing the method 500 of FIG. 5, in at least some other example embodiments the first or second 2D images may alternatively be used.

In performing the method 500, the processor 124 obtains, at block 502, 2D image data representing an image including an object. The 2D image data in the presently described example embodiment includes the third 2D image that the processor 124 generates at block 406 of the method 400 of FIG. 4. At block 504, the processor 124 obtains depth data of a portion of the image data that comprises the object, with the depth data indicating a depth of the object. The depth data in the presently described example embodiment includes data from the 3D image that the processor 124 generates at block 406 of the method 400 of FIG. 4. The processor 124 generates an initial 2D classification of the portion of the image using the 2D image data without using the depth data at block 506; for example, the processor 124 may apply 2D video analytics to generate the initial 2D classification. In at least some example embodiments in which the processor 124 uses a convolutional neural network to perform object classification, the convolutional neural network may concurrently detect and classify the object. Alternatively, the processor 124 may perform object detection and classification as two distinct operations. The processor 124 also determines whether the initial 2D classification of the portion of the image is consistent with the depth data at block 508. If the initial 2D classification is consistent with the depth data, the initial 2D classification is stored as an approved 2D classification (blocks 510 and 512). Otherwise, the processor 124 rejects the initial 2D classification 514 (blocks 510 and 514). The processor 124 may, for example, store the initial 2D classification itself at block 512 in the memory device 132. Alternatively or additionally, the processor 124 may send the approved 2D classification through the network 140 to one or both of the workstation 156 or a client device 164 to be stored.

The method 500 of FIG. 5 may be applied in various scenarios. For example, in at least some example embodiments the depth data may be used to enhance the ability of 2D video analytics to make use of object perspective and size. The processor 124 may at block 506 generate an initial 2D classification that classifies the first object as a vehicle, for example. One drawback of relying exclusively upon 2D image data when classifying an object, however, is that it may be difficult to assess the actual size of the object. For example, in a 2D image a smaller object positioned near to the camera 108 may appear identical to a larger and otherwise identical object positioned far from the camera 108. This may result in the processor 124 reporting false positives; i.e., reporting that an object such as a vehicle is present in the 2D image when the processor 124 has misidentified a miniature version of that object (e.g., a toy version of that object).

To mitigate this problem, at block 508 the processor 124 may determine a 2D size of the first object using the 2D image data without using the depth data. In an example in which the first object is a car, the processor 124 may determine a height of the car in pixels. The processor 124 may then compare the 2D size of the vehicle to an expected size of the vehicle for the known depth of the vehicle, with the vehicle's depth being determined from the depth data. The depth data that the processor 124 uses at block 508 may, for example, be an average depth value of the vehicle, or a single depth value corresponding to a single point on the vehicle. For example, the depth data may indicate that the first object that the processor 124 has identified as a car is ten meters away from the camera 108, and accordingly should have an expected size in the form of a pixel height within a certain range of values. If the 2D size of the vehicle is within the expected size of the vehicle for the vehicle's depth, then the processor 124 determines at block 510 that the initial 2D classification is consistent with the depth data, and stores the initial 2D classification as an approved 2D classification at block 512. If the 2D size of the vehicle does not match the expected size of the vehicle for the vehicle's depth, then the processor 124 rejects the initial 2D classification at block 514.

In at least some other example embodiments, the depth data may be used to enhance the ability of 2D video analytics to handle false positives that could otherwise result from 2D approximations of objects such as shadows, reflections, and images (e.g., posters and images on a television). In an example in which the first object is a person, at block 508 the processor 124 may determine whether the depth across the person varies. The depth data accordingly comprises at least two depth values corresponding to two different positions on the person, and in at least some example embodiments comprises more than two values. When the depth data indicates that the depth across the person varies, the processor 124 determines at block 510 that the initial 2D classification is consistent with the depth data, and stores the initial 2D classification as an approved 2D classification at block 512. Varying depth data implies that the object that has been classified as a person is, in fact, an actual person as opposed to a 2D representation of one such as a picture or a shadow, both of which are flat and whose depths are therefore constant. Accordingly, if the depth data is constant across the person, then the processor 124 rejects the initial 2D classification at block 514.

The processor 124 may also be used when the first object as depicted in the 2D image is partially obstructed by an obstruction such as a pillar. In at least some of these example embodiments, the obstruction abuts the first object, and the depth data indicates that the obstruction is nearer to a sensor that originated the depth data such as the camera 108 than the first object. Determining whether the initial 2D classification of the first object is consistent with the depth data comprises using the depth data to separate the obstruction from the partially obstructed or occluded first object. By virtue of this separation, the processor 124 identifies the unobstructed portion of the first object and causes the camera 108 to classify the object using the unobstructed portion and without using the obstruction. When the classification based on the exposed portion of the object matches the initial 2D classification, the initial 2D classification is stored as the approved 2D classification.

In at least some other example embodiments, the depth data may be used to assist in determining who has interfaced with a credentials reader, such as an access card reader that relies on near field communication to read the access card. The camera 108 may have within its field-of-view a large number of densely packed individuals proximate to the credentials reader. The processor 124 may wish to determine which individual has interfaced with the credentials reader to ensure that the credentials presented to the reader were, in fact, presented by the person who is authorized to use those credentials. The processor 124 may accordingly attempt to determine which of the persons in the camera's 108 field-of-view was nearest to the credentials reader at the time the credentials were presented to the reader.

The processor 124 accordingly applies 2D video analytics to classify one of the faces of the individuals ("first face") within the camera's 108 field-of-view as the face of the person who interacted with the credentials reader; the classification of the first face as being of the person who presented credentials to the reader is the initial 2D classification. The portion of the 2D image represented by the depth data includes the first face and at least one additional face ("second face") of another person who was proximate to the credentials reader at the time the credentials were presented to the reader. Determining at block 508 whether the initial 2D classification of the first face is consistent with the depth data comprises determining, using the depth data, whether the first face or the second face is nearer to the credentials reader. In at least some example embodiments, this comprises comparing the depths of each of the first and second faces to a known depth of the credentials reader, and determining that the face closer in depth to the credentials reader is that of the person who in fact presented the credentials to the reader. In at least some other example embodiments, the processor 124 determines which face is nearer to the credential reader based not only on depth, but as the Euclidean distance taking into account height and width (from the 2D image data) as well as depth (from the depth data).

When the depth data indicates that the first face is nearer to the credentials reader than the second face, the processor 124 stores the initial 2D classification as the approved 2D classification (blocks 510 and 512). In contrast, when the depth data indicates that the second face is nearer to the credentials reader than the first face, the processor 124 stores as the approved 2D classification that the second face is of the person who interacted with the credentials reader. The processor 124 may analogously apply this method to more than two faces to determine which of several persons proximate to the credentials reader was nearest the reader at the time the credentials were presented.

In at least some additional example embodiments, the depth data may be used to enhance the ability of 2D video analytics to count the number of persons in a portion of an image. In at least some of these example embodiments, the first object comprises a face of a person in the image portion ("first face"). The portion of the image also depicts a second object in the form of an additional face of another person ("second face"). Determining at block 508 whether the initial 2D classification is consistent with the depth data comprises determining, using the depth data and without using the 2D image data, whether the second face is present in the portion of the image where persons are being counted. This determination may be done based on depth data at the location of an actual face varying in view of facial features' varying height, whereas depth data of an image of a face (e.g., a picture of a face on a screen) not varying. When the depth data indicates both faces are present and consequently that both persons should be counted, the processor 124 at block 510 determines that the initial 2D classification is consistent with the depth data when the initial 2D classification has classified the first and the second objects as faces. In the event the initial 2D classification is determined to be consistent with the depth data, the processor 124 saves it as the approved 2D classification at block 512. If the initial 2D classification is determined to be inconsistent with the depth data at block 510, the processor 124 rejects it at block 514. The processor 124 may analogously apply this method to count more than two faces in any given portion of an image.

In at least some example embodiments in which the initial 2D classification is rejected at block 510, the processor 124 may then apply a different video analytics method in order to attempt to obtain a proper classification of the image. For example, the processor 124 may apply a first video analytics based method to generate the initial 2D classification that is rejected at block 510 as a result of being inconsistent with the depth data. In response, following performing block 514 the processor 124 may apply a second video analytics based method to generate another 2D classification of the portion of the image. The second video analytics based method may require more computational resources than the first video analytics based method, thereby resulting in a more accurate 2D classification of the number of faces in the image. If the second video analytics based method also returns a result that is inconsistent with the depth data, then in some example embodiments the processor 124 relies on the result returned by the second video analytics based method despite being inconsistent with the depth data. This may be done, for example, only if the result that the second video analytics based method returns meets a minimum confidence level (e.g., 80%). In at least some example embodiments, the processor 124 may also require that the result returned by the first video analytics based method also meets a minimum confidence level, which may or may not be the same as the confidence level the processor 124 requires of the second video analytics based method. Alternatively, where the result returned by the second video analytics based method is inconsistent with the depth data, the processor 124 may defer definitively determining a classification until additional data is acquired from subsequent video frames. In addition to or as an alternative to applying the second video analytics based method, the processor 124 may attempt to obtain a more accurate 2D classification by supplying guidance to, and then re-applying, the first video analytics based method.

In at least some additional example embodiments, the depth data may aid in classifying portions of the scene within the camera's 108 field-of-view and in analyzing a 2D classification in view of that scene classification. For example, the processor 124 may identify, using the depth data, certain fixed scene features. The fixed scene features may comprise, for example, walls, obstructions, different levels of a building, floors, platforms, pillars, escalators, elevators, and any other suitable features. The processor's 124 determining at block 508 of whether the initial 2D classification is consistent with the depth data may then comprise determining whether the initial 2D classification is consistent with the fixed scene features. The scene classification may be done with or without 2D image data. For example, classifying whether a portion of a scene is a flat wall may be done using only depth data.

For example, in at least some example embodiments, the processor 124 may determine from the fixed scene features whether the portion of the image permits an object in the form of a person to be present. The processor 124 may determine using the depth data that a scene comprises two levels of a shopping mall connected by an escalator, for example. Consequently, persons may be located on one of the two levels and on the escalator, but not elsewhere in the scene. In the event the initial 2D classification is that a person is located anywhere in the image aside from on one of the two levels or on the escalator, the processor 124 accordingly concludes that the initial 2D classification is inconsistent with the depth data at block 510 and proceeds to reject the initial 2D classification at block 514. In contrast, an initial 2D classification that a person is located on the floors or the escalator is consistent with the scene classification derived from the depth data, and is stored as the approved 2D classification at block 512.

In at least some additional example embodiments, the processor 124 may use the depth data to guide the 2D classification. For example, instead of determining an initial 2D classification without using the depth data and subsequently using the depth data to verify the initial 2D classification, the processor 124 may use the depth data to identify fixed scene features as described above and then generate a 2D classification using the 2D image data and the fixed scene features. For example, instead of generating an approved 2D classification by confirming that an initial 2D classification of a person is properly situated on an escalator as described above, the processor 124 may use the depth data to aid in generating the 2D classification by excluding from possible 2D classifications those objects that are unsuitable for placement on an escalator. This may allow the processor 124 to select a classification from a smaller possible list of classifications than if the 2D classification were performed without being guided by the depth data (e.g., the processor 124 may be able to exclude "vehicle" as a classification by virtue of concluding from the depth data that the object is on an escalator).

Figure 6:
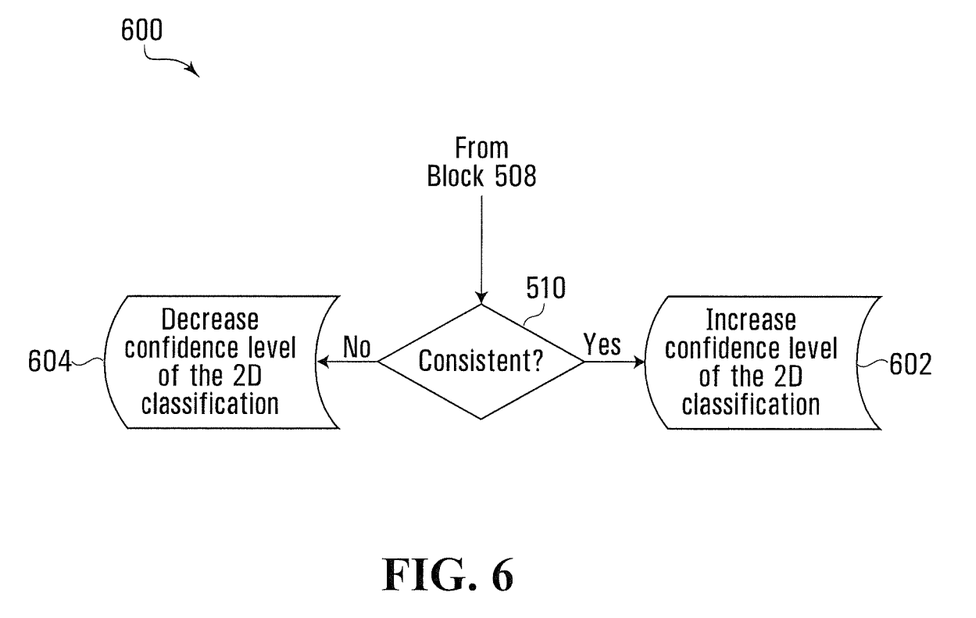
FIG. 6 depicts a method for adjusting the confidence level of a classification generated using two-dimensional video analytics by using depth data, according to another example embodiment.

In the method 500 of FIG. 5, in response to determining whether the initial 2D classification is consistent with the depth data, the processor 124 either stores the initial 2D classification as an approved 2D classification at block 512 if the initial 2D classification and depth data are consistent, or rejects the initial 2D classification at block 514 if the initial 2D classification and depth data are inconsistent. In at least some different example embodiments, the processor 124 may take different action in response to the consistency determination made at block 510. For example, FIG. 6 depicts an example method 600 for adjusting the confidence level of a classification generated using two-dimensional video analytics by using depth data. The method 600 of FIG. 6 is analogous to the method 500 of FIG. 5 until after the processor 124 makes the consistency determination at block 510. In the method 600 of FIG. 6, if the initial 2D classification is consistent with the depth data, the processor 124 proceeds to block 602 where it increases the confidence level associated with the 2D classification. For example, the processor 124 may store metadata in the metadata storage module 256 representing an increased confidence level of the classification; the processor 124 may do this by writing new metadata to the metadata storage module 256 or altering existing metadata stored in the metadata storage module 256. Analogously, if the initial 2D classification is inconsistent with the depth data, the processor 124 proceeds to block 604 where it decreases the confidence level associated with the 2D classification; this again may be done by storing metadata in the metadata storage module 256 representing a decreased confidence level of the classification.

It is contemplated that any part of any aspect or embodiment discussed in this specification can be implemented or combined with any part of any other aspect or embodiment discussed in this specification.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method comprising:
    obtaining two-dimensional (2D) image data representing an image comprising a first object;
    obtaining depth data of a portion of the image that comprises the first object, wherein the depth data indicates a depth of the first object;
    generating an initial 2D classification of the portion of the image using the 2D image data without using the depth data;
    determining whether the initial 2D classification of the portion of the image is consistent with the depth data by:
        determining a 2D size of the first object using the 2D image data without using the depth data;
        comparing the 2D size of the first object to an expected size of the first object for the depth of the first object; and
        determining that the initial 2D classification is consistent with the depth of the first object when the 2D size of the first object is the expected size of the first object; and
    when the initial 2D classification of the portion of the image is consistent with the depth data, increasing a confidence level of the initial 2D classification.

2. The method of claim 1, further comprising:
    when the initial 2D classification of the portion of the image is consistent with the depth data, storing the initial 2D classification as an approved 2D classification.

3. The method of claim 1, further comprising when the initial 2D classification is inconsistent with the depth data, rejecting the initial 2D classification.

4. The method of claim 1, wherein determining whether the initial 2D classification is consistent with the depth data further comprises:
    determining by using the depth data whether the depth of the first object varies; and
    when the depth data indicates that the depth of the first object varies, storing the initial 2D classification as an approved 2D classification.

5. The method of claim 4, wherein the depth data indicates that the depth of the first object is constant, and the first object is a shadow or a reflection.

6. The method of claim 1, wherein the portion of the image represented by the depth data further comprises an obstruction abutting the first object, the depth data indicates the obstruction is nearer to a sensor that originated the depth data than the first object, and determining whether the initial 2D classification is consistent with the depth data further comprises:
    determining by using the depth data an unobstructed portion of the first object;
    determining a subsequent classification using the unobstructed portion of the first object and without using the obstruction; and
    when the subsequent classification and the initial 2D classification match, storing the initial 2D classification as an approved 2D classification.

7. The method of claim 1, wherein the first object comprises a first face, the initial 2D classification is that the first face is of a person who interacted with a credentials reader, the portion of the image represented by the depth data further comprises a second face, and determining whether the initial 2D classification is consistent with the depth data further comprises:
    determining, using the depth data, whether the first face or the second face is nearer to the credentials reader; and
    when the depth data indicates that the first face is nearer to the credentials reader than the second face, storing the initial 2D classification as an approved 2D classification.

8. The method of claim 7, further comprising:
    when the depth data indicates that the second face is nearer to the credentials reader than the first face, storing as the approved 2D classification that the second face is of the person who interacted with the credentials reader.

9. The method of claim 1, wherein the first object comprises a first face, the portion of the image represented by the depth data further comprises a second object comprising a second face, and determining whether the initial 2D classification is consistent with the depth data further comprises:
    determining, using the depth data and without using the 2D image data, that the second face is present in the portion of the image; and
    when the initial 2D classification classifies each of the first and the second objects as a face, storing the initial 2D classification as an approved 2D classification.

10. The method of claim 9, wherein the initial 2D classification is performed by a processor applying a first video analytics based method that causes the processor to determine the initial 2D classification as classifying the first object as a face and not the second object as a face, and further comprising, when the initial 2D classification classifies the first object and not the second object as a face, guiding the first video analytics based method or applying a second video analytics based method to generate another 2D classification of the portion of the image that classifies each of the first and the second objects as a face.

11. The method of claim 1, further comprising classifying, using the depth data without using the 2D image data, the portion of the image to identify fixed scene features, and wherein determining whether the initial 2D classification is consistent with the depth data further comprises determining whether the initial 2D classification is consistent with the fixed scene features.

12. The method of claim 11, wherein the first object comprises at least part of a person, and determining whether the initial 2D classification is consistent with the fixed scene features further comprises:
    determining, from the fixed scene features, whether the portion of the image permits the person to be present; and
    when the portion of the image permits the person to be present, storing the initial 2D classification as an approved 2D classification.

13. The method of claim 1, wherein increasing the confidence level of the initial 2D classification comprises storing metadata representing an increase in the confidence level of the initial 2D classification.

14. The method of claim 1, further comprising when the initial 2D classification is inconsistent with the depth data, decreasing a confidence level of the initial 2D classification.

15. The method of claim 14, wherein decreasing the confidence level of the initial 2D classification comprises storing metadata representing a decrease in the confidence level of the initial 2D classification.

16. The method of claim 1, further comprising:
    classifying, using the depth data, the portion of the image to identify fixed scene features; and
    generating a 2D classification using the fixed scene features and the 2D image data.

17. The method of claim 1, further comprising:
    obtaining, using a first image sensor, a first two-dimensional (2D) image;
    obtaining, using a second image sensor co-located with the first image sensor and having an overlapping field of view with the first image sensor, a second 2D image captured concurrently with the first 2D image; and
    generating:
        a three-dimensional image by performing a stereoscopic combination of the first and second 2D images; and
    from the first and second 2D images, a third 2D image that has a higher resolution than a resolution of either the first and second 2D images.

18. The method of claim 17 wherein the first image sensor is a red green blue (RGB) image sensor and the second image sensor is a monochrome image sensor.

19. The method of claim 17 wherein each of the first and second image sensors is a monochrome sensor.

20. The method of claim 17 wherein generating the third 2D image comprises interpolating pixels of the third 2D image from the first and second images.

21. A system, comprising:
    a camera configured to output two-dimensional (2D) image data representing an image comprising a first object and depth data of a portion of the image that comprises the first object, wherein the depth data indicates a depth of the first object; and
    a computing device, comprising:
        a processor communicatively coupled to the camera; and
        a memory device having stored thereon computer program code that is executable by the processor and that, when executed by the processor, causes the processor to perform a method comprising:
            obtaining the 2D image data;
            obtaining the depth data;
            generating an initial 2D classification of the portion of the image using the 2D image data without using the depth data;
            determining whether the initial 2D classification of the portion of the image is consistent with the depth data by:
                determining a 2D size of the first object using the 2D image data without using the depth data;
                comparing the 2D size of the first object to an expected size of the first object for the depth of the first object; and determining that the initial 2D classification is consistent with the depth of the first object when the 2D size of the first object is the expected size of the first object; and when the initial 2D classification of the portion of the image is consistent with the depth data, increasing a confidence level of the initial 2D classification.

22. The system of claim 21, wherein the method further comprises when the initial 2D classification is inconsistent with the depth data, decreasing the confidence level of the initial 2D classification.

23. A non-transitory computer readable medium encoded with a computer program code that is executable by a processor and that, when executed by the processor, causes the processor to perform a method comprising:

obtaining two-dimensional (2D) image data representing an image comprising a first object;

obtaining depth data of a portion of the image that comprises the first object, wherein the depth data indicates a depth of the first object;

generating an initial 2D classification of the portion of the image using the 2D image data without using the depth data;

determining whether the initial 2D classification of the portion of the image is consistent with the depth data by:

determining a 2D size of the first object using the 2D image data without using the depth data;

comparing the 2D size of the first object to an expected size of the first object for the depth of the first object; and determining that the initial 2D classification is consistent with the depth of the first object when the 2D size of the first object is the expected size of the first object; and when the initial 2D classification of the portion of the image is consistent with the depth data, increasing a confidence level of the initial 2D classification.

\* \* \* \* \*